United States Patent [19]
Masucci et al.

[11] Patent Number: 5,418,535
[45] Date of Patent: May 23, 1995

[54] MIXED RADAR/GRAPHICS INDICATOR

[75] Inventors: Carmine Masucci, Eastchester; Menachem Cohen, Flushing; John J. Williams, Brentwood, all of N.Y.

[73] Assignee: Cardion, Inc., Woodbury, N.Y.

[21] Appl. No.: 142,154

[22] Filed: Oct. 25, 1993

[51] Int. Cl.$^6$ .................. G01S 7/04; G01S 7/298
[52] U.S. Cl. .................... 342/185; 342/197; 342/182
[58] Field of Search ............... 342/185, 186, 176, 177, 342/179, 181, 182, 183, 197

[56] References Cited

U.S. PATENT DOCUMENTS

| | | | |
|---|---|---|---|
| 4,387,365 | 6/1983 | Berry et al. | 342/185 X |
| 4,434,422 | 2/1984 | Kenol et al. | 342/185 |
| 4,689,675 | 8/1987 | Tchobajian et al. | 348/442 |
| 4,740,789 | 4/1988 | Henri et al. | 342/185 |
| 4,754,279 | 6/1988 | Cribbs | 342/185 |
| 4,845,501 | 7/1989 | Pease et al. | 342/185 |
| 4,931,801 | 6/1990 | Hancock | 342/185 |
| 5,218,674 | 6/1993 | Peaslee et al. | 395/166 |
| 5,255,360 | 10/1993 | Peaslee et al. | 395/162 |

*Primary Examiner*—John B. Sotomayor
*Attorney, Agent, or Firm*—Lawrence C. Edelman

[57] ABSTRACT

A radar indicator comprising a source of radar image signals having a first (r,θ) format and a digital scan converter responsive to the radar image signals for converting the radar image signals from the first format to digital radar image signals having a second (X-Y) format. The digital scan converter includes an image memory for supplying the digital radar image signals having the second (X-Y) format. A source of external video image signals having the second format, including video synchronization signals is provided. A synchronization signal stripper and clock signal generator circuit is responsive to the video synchronization signals of the external video image signals for generating a clock signal synchronized with the synchronization signals of the external video image signals. The clock signal is applied to the image memory of the digital scan converter for causing controlled read-out of the digital radar image signals in a manner synchronized with the image signals of the source of external video image signal. Video processing circuitry responsive to the synchronized digital radar image signals develop a radar video signal from the synchronized radar image signals, and a video mixer circuit mixes in a controlled manner the external video image signal with the synchronized radar video signals. The mixed external video images with the radar video images are subsequently displayed.

12 Claims, 3 Drawing Sheets

MIXED RADAR/GRAPHICS INDICATOR

FIELD OF THE INVENTION

The present invention relates to radar indicator systems, and in particular, to a radar indicator system including a digital scan converter having a memory whose read-out is controlled in a manner synchronized with an external source of graphic video signals so that direct, pixel-by-pixel, mixing of the radar and external graphic video signals can be accomplished.

BACKGROUND OF THE INVENTION

Prior radar indicators, such as the AN/SPA-25G available from, e.g. Cardion, Inc., Woodbury, N.Y. contain an integral scan converter which enables display of radar with graphic overlay on a high-resolution, high-contrast CRT. This type of radar indicator is designed to increase operator functional capability and yet decrease workload through efficient man-machine interface. The indictor solves all the range, bearing and plotting tasks associated with target tracking and navigation. Radar input, correlated with internally generated and operator selected graphic symbology, provides a tactical display for both CIC and bridge environments. Radar systems are also known which include digital scan converters, as well as external graphic image generation equipment. One such equipment is the ASDE-3 (Airport Surface Detection Equipment) available from the before noted Cardion, Inc., which is used for monitoring ground traffic at various domestic and foreign airports.

The current prior art solution for combining the radar images with the externally generated graphical images requires the use of a frame store which receives the output of the radar scan converter and a synchronization circuit having as an input the source of external graphic signal and then controls the readout of the image frame memory in a manner synchronized with the external graphic signal.

It is an object of the present invention to provide the functionality of the prior art system in a more simplified manner and making use, where possible, of generally available consumer-type equipment, thereby reducing cost without reducing reliability.

SUMMARY OF THE INVENTION

A radar indicator, comprising:
a source of radar image signals having a first $(r,\theta)$ format;
a digital scan converter responsive to the radar image signals for converting the radar image signals from the first format to digital radar image signals having a second (X-Y) format, the digital scan converter including an image memory for supplying the digital radar image signals having the second (X-Y) format;
a source of external video image signals having the second format, including video synchronization signals;
a synchronization signal stripper and clock signal generator circuit responsive to the video synchronization signals of the external video image signals for generating a clock signal synchronized with the synchronization signals of the external video image signals;
the clock signal being applied to the image memory of the digital scan converter for causing controlled read-out of the digital radar image signals in a manner synchronized with the image signals of the source of external video image signal;
video processing circuitry responsive to the synchronized digital radar image signals for developing a radar video signal from the synchronized radar image signals;
a video mixer circuit for mixing in a controlled manner the external video image signal with the synchronized radar video signals; and
a display for displaying the mixed external video images with the radar video images.

BRIEF DESCRIPTION OF THE DRAWINGS

As shown in FIG. 1, the input radar video 2 from a conventional source 4 of radar signal, not specifically shown, is applied to the Digital Scan Converter (DSC) 6. The DSC, X, Y formatted output is typically fed to a monochrome TV monitor for non-mixed system configurations. Implementation of the present invention requires the insertion of a video mixer board 10 into the digital scan converter 8 card cage for the mixing/synchronization of the composite radar video signal from the DSC with the synthetic data RGB output 14 from a workstation 15. Workstation 15 includes a general purpose computer or PC 16 and an RGB display 18. (Typically, in accordance with the prior art, the RGB output from the graphics controller portion of the PC 16 is applied to the RGB input of the workstation color display monitor 18.) The displayed radar video data may be the background, foreground or lie between the RGB synthetic, graphical and textual data from the graphics controller of the work station s set by the PC operator using "chroma key" selection.

Figure 1:
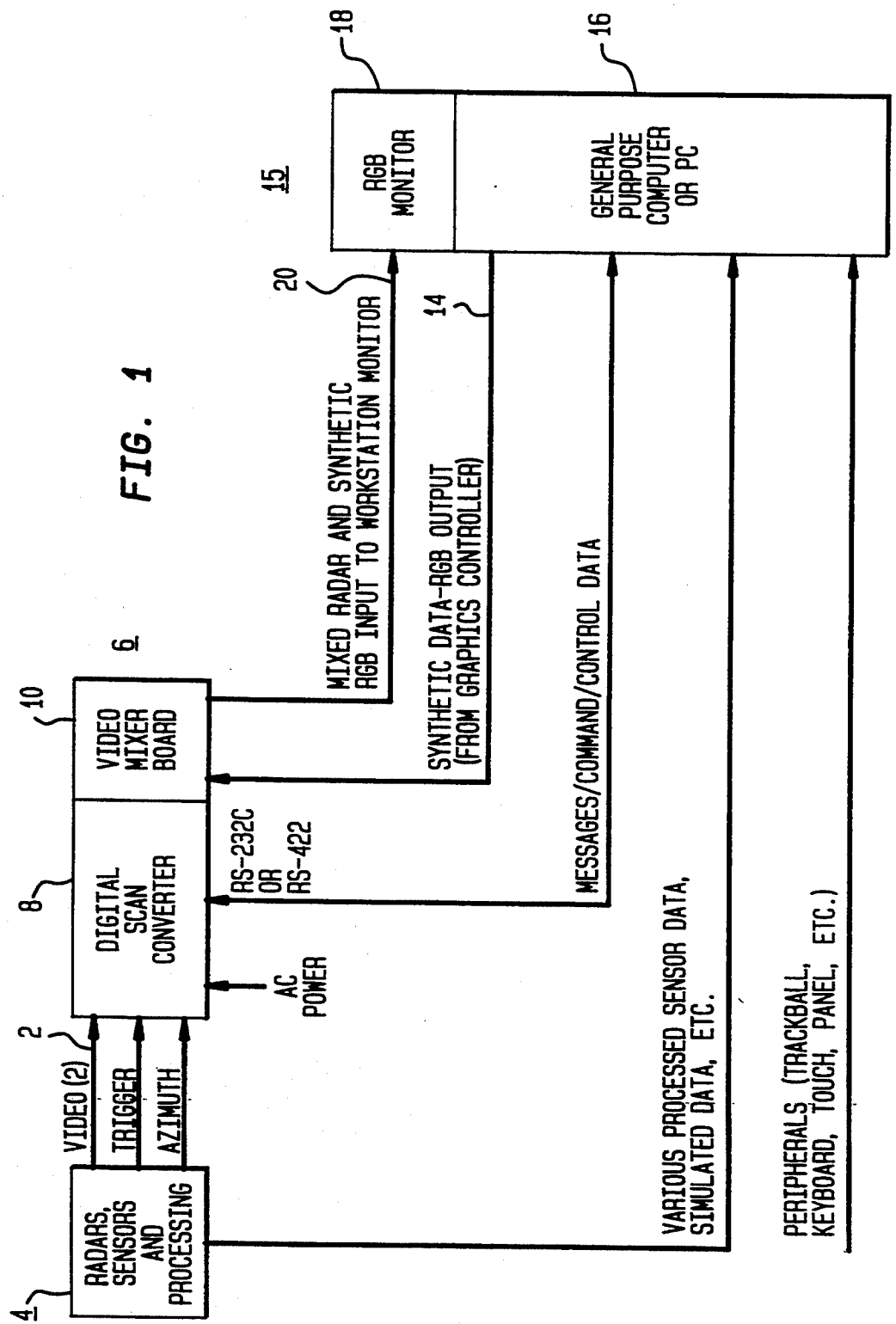
FIG. 1 is a system block diagram of the graphics/radar mixer in a radar indicator, constructed in accordance with the principles of the invention.

The control of the DSC to conform to the work station synthetic data display is via the work station operator controlled keyboard/peripherals and an RS-232 interface.

The new radar digital scan converter (DSC) is basically a version used in the U.S. Navy qualified AN/SPA-25G shipboard radar indicator available from e.g., CARDION, Inc., including modifications as described below.

The DSC 6 consists of the standard scan converter circuits 8 plus video mixer 10 circuits. The DSC generates a PPI type radar presentation in composite TV (X, Y raster) video format. The DSC receives input data in the form of radar video, trigger and antenna information and generates a 60 Hz/72 Hz noninterlaced TV type output.

The video mixer board functions with the high resolution graphics controller of computer 16 and the DSC 8, and generates a combined radar/graphics display having a resolution of 1280 pixels/line and 1024 lines/frame and operating in the 60 Hz/72 Hz noninterlaced mode. In addition to those characteristics enumerated above DSC 8 includes, among others, the following features:

a. Provides red, green (with sync), blue and sync coaxial outputs from the embedded video mixer board
   Consists of combined digital scan converter and computer work-station video outputs
   Scan converter resolution of the radar image is 1280×1024 at a 60 Hz/72 Hz noninterlaced frame rate
b. Accepts either synchro or ACP/ARP radar azimuth
c. Provides for eight gray levels (3-bit deep memory planes) of radar TV video
   Radar decay time (persistence) variable from one (1) level of decay per ¼ second to one (1) level per 60 seconds and infinite (no decay) plus radar freeze
d. Writes radar video into memory in a read-modify-write mode, wherein the largest data—new data or old (stored) data—is stored in memory
e. Provides aximuth interpolation to fill "holes"
f. Accomplishes a display accuracy of ±0.25% of the range in use or ±15 yards, whichever is greater
g. VME-compatible card set with 68000 System Processor as bus controller
h. Incorporates both software assembly language and C high order language for fast, efficient processing.
In providing the following features, the DSC responds to operator-initiated commands from the RS-232C interface with the computer workstation.
i. Provides video mixing mode selection to permit placement of radar video image under, over or between defined features (colors) of the synthetic picture
j. Provides individual gain control for each of two (2) synchronous radar video inputs per radar channel
   Workstation RGB gain, monitor brightness, etc. are controlled via workstation keyboard
k. Provides for continuous range selection from 0.25 nm (nautical miles) to 250 nm per radius (extended mode 0.5 nm to 500 nm).
l. Provides effective zoom capability via offset and range change
   Magnification by 2×, 4× or 8×
m. Provides for continuous up to 7.5 radii center offset without degradation
   Maximum offset to 500 nm
n. Includes capability for on-line and off-line built-in-test.

Figure 2:
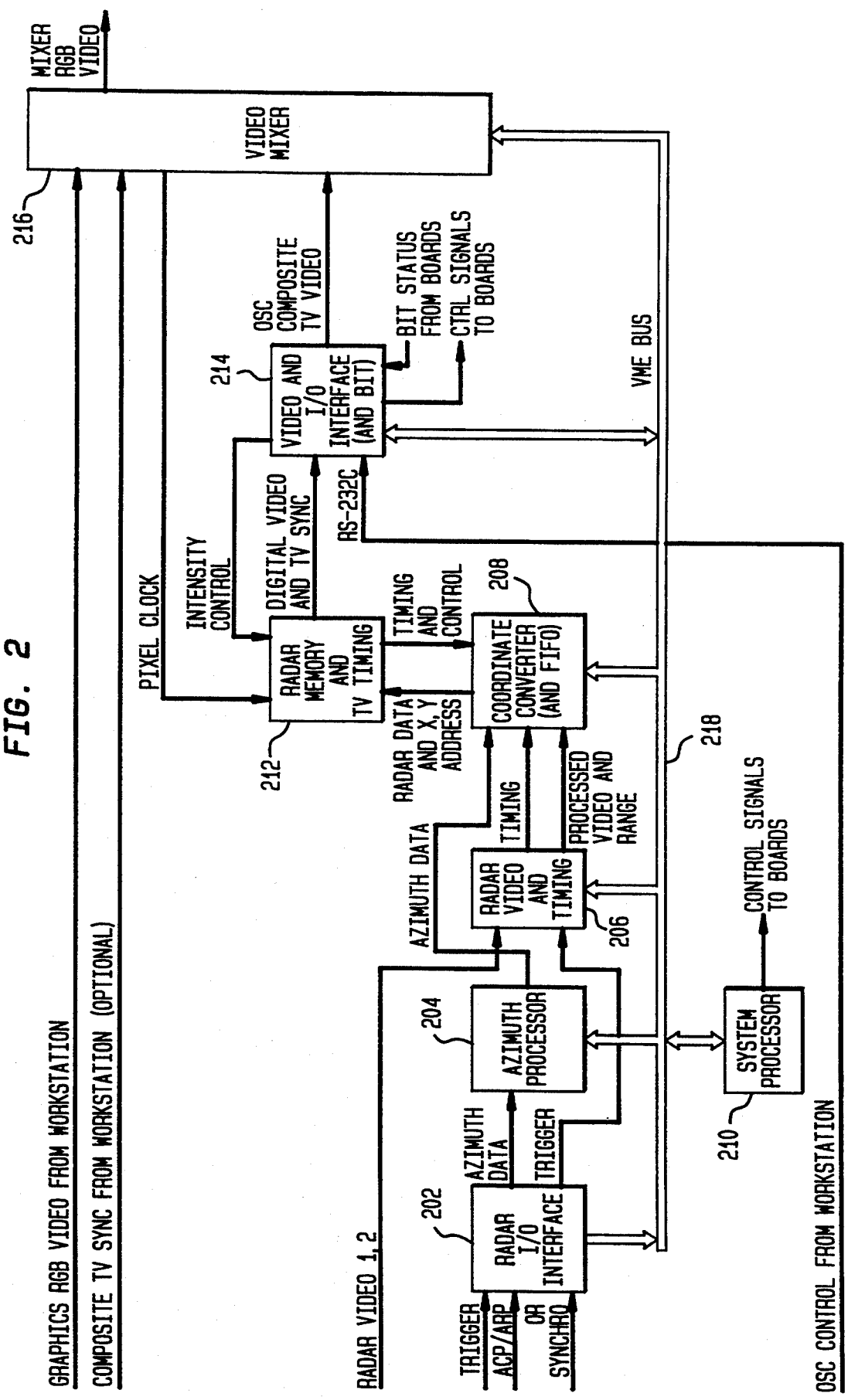
FIG. 2 is a functional block diagram of a digital scan converter and video mixer, constructed in accordance with the principles of the invention.

FIG. 2 illustrates a functional block diagram of the digital scan converter. The DSC is divided into the following major sections: radar processing, TV memory and video, video mixing, and control and interface.

The radar processing section consists of a Radar I/O Interface 202, Aximuth Processor 204, Radar Video and Timing 206, and Coordinate Converter boards 208.

Radar I/O Interface 202

This board receives radar triggers and antenna azimuth in either synchro or ACP/ARP format. The radar triggers, which are coincident with range zero, are used to generate synchronized sweep timing signals for control of the radar processing circuits. The antenna signals consist of either 5-wire synchro or 4096 ACPs (azimuth change pulses) per antenna revolution and 1 ARP (azimuth reference pulse) at 0 degrees north. The selection of synchro or ACP/ARP input is accomplished by a jumper on the board. The synchro signals or azimuth pulses are converted to 12-bit antenna azimuth data.

Azimuth Processor 204

This board operates on the 12-bit digital azimuth data. Azimuth processing is performed with a 12-bit ALU (arithmetic logic unit) and a programmed controller. Processing is initiated every radar trigger. Azimuth processing accomplishes the following:
   a. Furnishes updated azimuth data to the Coordinate Converter.
   b. Generates north interrupts when azimuth passes through 0 degrees.
   c. Indicates the direction of antenna rotation.
   d. Determines the number of azimuth changes that occur between radar triggers (used by Coordinate Converter hole fill-in circuit).
   e. Processes test target azimuth data for on-line BIT (built-in-test).

A radar test input from the System Processor 210 activates test trigger, sweep, azimuth and video signals for radar BIT.

Radar Video and Timing 206

This board receives up to two synchronized radar video returns, azimuth sweep timing from the Radar I/O Interface 202 and range control data from the System Processor 210. It non-additively mixes the two radar videos (returns), samples and digitizes the mixed video and generates range-azimuth synchronized digital radar video for subsequent storage.

Continuous range selection from 0.25 nm to 250 nm (or extended mode 0.5 nm to 500 nm) per radius is available. Radar video returns are processed within the above ranges. The higher PRFs are generally used for short close-in ranges. These pulses have narrower pulse widths while the lower PRFs used at longer ranges have wider pulses.

In the analog-to-digital conversion process, each video return pulse must be sampled at or near its peak amplitude. For conversion accuracy, a minimum of two samples is taken of each video return pulse. The number of samples increases with the pulse width and, therefore, with the range. Range timing signals are generated with a frequency synthesizer (not shown) controlled by the System Processor 210, which produces the required range and sampling clocks.

Range processing is accomplished using twelve (12) range bits which are truncated to 10 bits before being applied to the TV memory. The System Processor determines the processing range based on the selected display range and offset.

Coordinate Converter 208

This board contains the circuitry to convert the radar range and azimuth (bearing) data in polar (r, θ) coordinates to cartesian (X,Y) coordinates needed for radar video storage and raster scan display.

Incoming range, azimuth, and radar video data bits are buffered and stored in a FIFO (first-in first-out) memory. The purpose of the FIFO is to accept incoming bursts of video returns and then to output them at a rate compatible with the speed of the display memory.

Azimuth information output from the FIFO is sent to sine and cosine look-up PROMs. The output of the PROMs and range count from the FIFO are then multiplied to produce X, Y coordinate data. The X, Y and video data may then be offset up to 7.5 range radii. The resulting X, Y and video data is subsequently written into the radar memory planes for eventual TV readout.

A side-effect of digital coordinate conversion is the appearance of spaces or "holes" in the displayed radar video. This occurs when there is not at least one radar trigger for each azimuth change, and also when radar is offset from center. The effect is that beginning at a particular range, adjacent azimuth angles are undefined. Coordinate converter 208 contains circuitry to fill these holes. The algorithm employed by the circuit assumes that if valid video was present at a previously defined azimuth, then it is assumed to be present at the undefined azimuth. The undefined azimuth is then artificially generated in X, Y form and combined with video data.

The TV memory and video section consists of the Radar Memory and TV Timing board 212 and the video output portion of the Video and I/O Interface board 214.

Radar Memory and TV Timing 212

This board contains horizontal and vertical timing circuits for control of the dynamic RAMs (random assess memory) which make up the three radar memory planes located on the board. The radar memory planes store radar video data in X, Y format which is to be displayed on the workstation color monitor 18. The timing circuits control the placement of data in the memory planes and allow the data to be operated on (magnified, decayed, frozen, erased), refreshed and then retrieved to be mixed/synchronized in the Video Mixer board with the workstation RGB output 14.

All timing is generated by a frequency synthesizer which is crystal controlled in stand-alone operation or synchronized to the pixel clock generated on the Video Mixer—genlocked to the PC graphics controller of the computer work-station—in mixed operation.

The radar video is stored, nominally, in a central 1024 pixel diameter circular area, or 1024 by 1024 square area, but is positionable under program control (factory set) to be coincident with any location within the workstation 1280 by 1024 pixel per line area. The stored radar data are read out of memory for display on the workstation monitor 18.

Radar video data is written into memory on a read-modify-write mode. If the new data is greater in value (3 bits have values between 0 and 7) than the old data (at each memory address), it overwrites the old. If the old data is greater, it is not overwritten. Thus the strongest radar returns do not get prematurely eased. As the data is read out of memory, radar video decay is accomplished by decrementing the 3-bit (8-level) digital value by 1 level (at a program-controlled time) and rewriting the value back into memory. The data is then multiplied by digital gain/intensity control bits and output to the Video and I/O Interface for digital-to-analog conversion.

Video and I/O Interface 214

The TV video portion of the Video and I/O Interface board 214 receives digital video bits and composite TV sync from the Radar Memory and TV Timing 212. The digital video is processed through a high-speed video DAC (digital-to-analog converter). The analog video, which is then processed to include horizontal and vertical sync and blanking, would (in the prior art) typically drive a monochrome TV monitor. In accordance with the present invention, however, the signal is applied to a Video Mixer 216.

Video Mixer 216

This board provides the means to combine the monochrome radar video output of the DSC with the RGB video output (synthetic, graphical and textual data) of the graphics controller of the workstation 15. Since the two video sources are each now in synchronous analog TV raster format, direct, high-resolution mixing is easily accomplished.

The Video Mixer board 216 accepts external RGB video 20 and external composite sync if available. It extracts horizontal and vertical sync timing and uses the extracted horizontal sync signal to generate the DSC pixel clock using a voltage controlled crystal oscillator in a phase locked loop. Using the pixel clock and the extracted horizontal and vertical sync signals, the mixer generates preset signals to synchronize the vertical counters on the Radar Memory and TV Timing board.

The Video Mixer 216 receives chroma key and mode selection data over the VME bus 218. The System Processor 210 receives these setting from the workstation 15 via the RS-232C port on the Video and I/O Interface board 214. There are three chroma key circuits, two for RGB video and one for radar video. The chroma key circuits detect when the video inputs equal the chroma key setting. Each RGB chroma key circuit consists of 6 voltage comparators forming 3 window comparators, one for each color. The window comparator threshold settings are received from the System Processor via the VME bus. The range of the chroma key adjustments is from black to white allowing any RGB color combination to be chosen. The radar video chroma key circuit consists of 2 voltage comparators forming 1 window comparator. The radar window comparator threshold settings are fixed. The radar video chroma key is factory set to black.

The external RGB video is monitored by the chroma circuits in real-time on a pixel-by-pixel basis. By using a high-speed (9 ns) switch, the external green video is replaced with the internal radar video from the Video and I/O Interface, in response to the chromo key signals using one of three modes: overlay, underlay or combined underlay/overlay. The external red and blue videos are replaced with the black reference level. Appropriate delays are added to the video signal paths before mixer 216, so that the video signals and chromo key signals arrive at the mixer 216 at the same time.

The video and sync input and output connections to the board are via SMA-type edge connectors: workstation signals at the front edge and DSC radar input at the rear edge between the VME P1 and P2 connectors.

Control and Interface

The control and interface section consists of the System Processor 210 and the RS-232 and BIT interface portions of the Video and I/O Interface board 214.

System Processor 210

This board provides central processing and supervisory control of all digital scan converter operations. It is microprocessor based and primarily software controlled by programs stored in PROMs for initialization and operating routines. Initialization routines clear the system and set up RAM functions, radar hardware functions, data bases, communication channels, and timer functions for timing the execution of tasks during the operation routines. User and storage RAM areas are designated.

The operating routines are performed in a continuous loop under the executive control—a real-time task scheduler based on functional priorities. They process workstation messages, rescale after range change and display offset, perform math routines, and execute BIT routines and generate a BIT status message.

The main controlling element is a 16-bit 68000 microprocessor running at 8 MHz. The processing operations are primarily software controlled by programs stored in PROM. PROM size is 64K by 16-bit with the option of expanding to 128K by 16-bit. Dynamic RAM is used for temporary storage and scratchpad. RAM size is 64K by 16-bit with the option of expanding to 128K by 16-bit.

Data transfers to/from the memory mapped scan converter boards are conducted over common VME bus address, data and control lines. For an output data transfer, the memory-mapped address, data, and control signals are issued. Data transfers are acknowledged by the receiving circuits. Transfer of data to the System Processor 210 is conducted over the data bus. These transfers are initiated by an interrupt request form the data source, along with a vector which identifies the source and type of interrupt. Data is then read and the transfer acknowledged by the System Processor.

Special purpose hardware control signals (independent of the VME bus) to other boards are also generated in the System Processor.

RS-232 Interface

The bi-directional RS-232 interface port enables a data exchange of serial synchronous messages to and from the digital scan converter at a nominal 2400 baud rate (38.4K baud maximum). Handshake (protocol) signals consist of the following: request to send, clear to send, data set ready and data terminal ready. The interface port parameters—baud rate, parity, stop bits—are programmable, based on end user specifications.

Commands received via the RS-232 interface are decoded and either sent to the System Processor or passed on directly as dedicated board control signals.

Video Mixing

As discussed above, the Video Mixer 216 combines the monochrome radar video output from the digital scan converter and the analog RGB video output (synthetic, graphical and textual data) from the computer workstation graphics controller.

The process of combining the two video sources allows the radar video image to: (Mode 1) underlay, (Mode 2) overlay or (Mode 3) be placed between the defined features (colors) of the synthetic picture. Mixing is accomplished in real-time on a pixel-by-pixel basis. The mixing mode is determined by the assigned definition of three chroma keys The chroma keys are user defined by their color or relative values of the red, blue and green components on a scale of zero to 255 each including black (0,0,0).

Chroma Key 1 is the graphics background color. In Modes 1 and 3 any pixel which contains graphics of this color will be replaced with radar (if radar is present at this pixel) or with black. The color should probably be chosen as black but this it not a requirement. If a color other than black is selected, it should be a unique color—not used for any other displayed data.

Chroma key 2 is the graphics underlay color. In Mode 3 any pixel which contains graphics of this color is replaced by radar if the radar intensity is non-zero.

In mode 3, at any pixel which contains graphics other than the chroma key 1 or chroma key 2 color, the graphics overlays radar.

Chroma key 3 is the zero-intensity color for radar. The color is set to black at the factory. Chroma key 3 is used in Mode 2 and 3.

Figure 3:
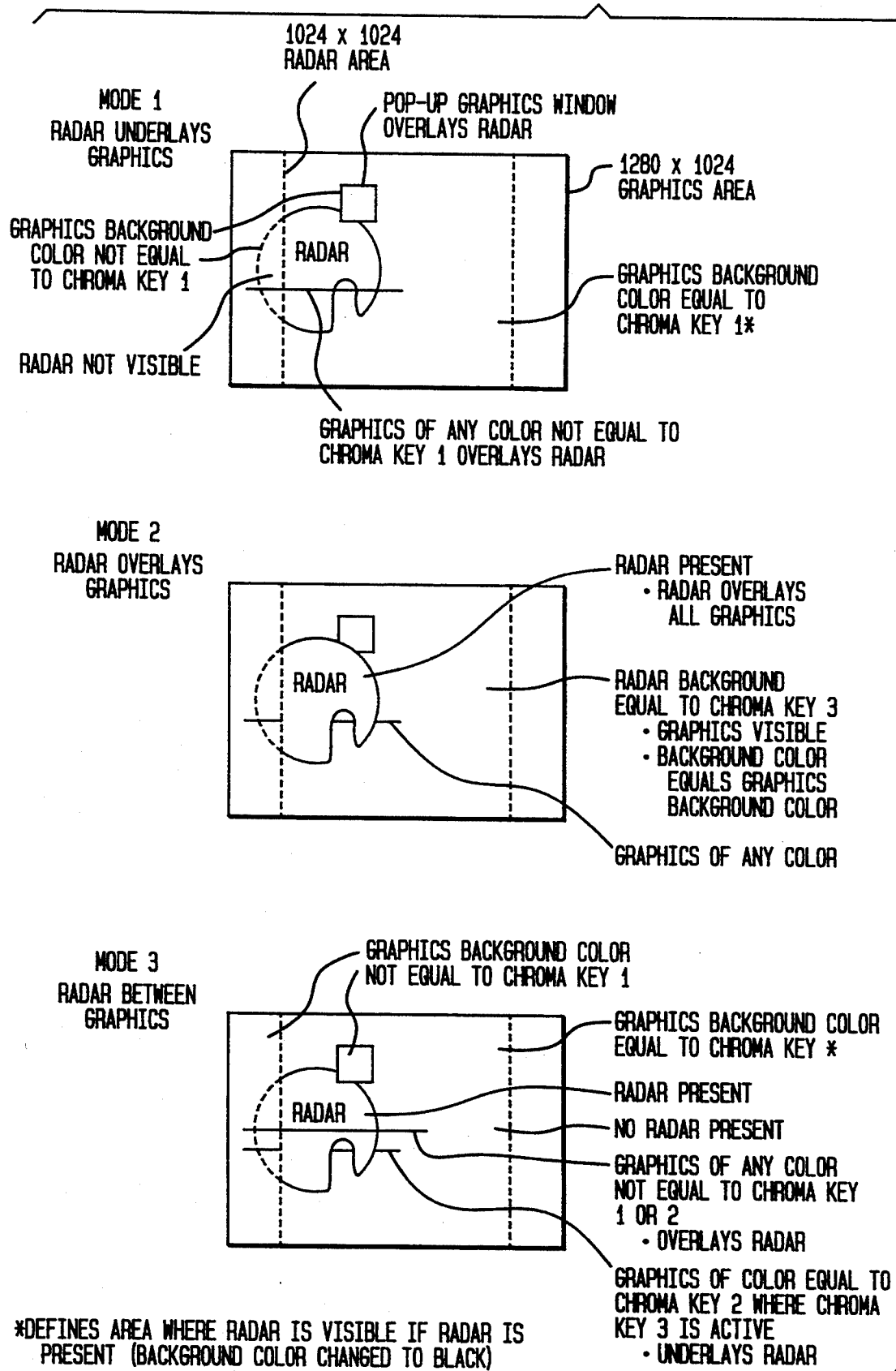
FIG. 3 illustrates various mixing modes for the graphics/radar images.

FIG. 3 illustrates the three mixed modes. Mixed mode 1, wherein radar underlays graphics, requires the user to define chroma key 1 only. Mixed mode 2, wherein radar overlays graphics, requires chroma key 3 only. It should be noted that for mode 2 the scan converter radar input circuit must be adjusted so that the radar video input is thresholded above zero volts. If adjusted incorrectly so that radar noise is displayed at every pixel, graphics data will not be displayed.

Mixed mode 3, wherein radar is placed between graphics features, requires the user to define both chroma key 1 and 2. Chroma key 2 defines the color of the background plane data, e.g., a map plane. Chroma key 1 defines the graphics background color for radar. At any pixel which contains graphics other than the chroma key 1 or chroma key 2 color the graphics is in the foreground.

In mixed Modes 1 (and 3), pop-up windows will overlay radar data if their graphics and background colors are different from chroma keys 1 (and 2). In mixed Mode 2 radar overlays all graphics including pop-up-windows.

The radar hardware limits the maximum radar area to a 1024 by 1024 square. This area may be reduced to a smaller square or a PPI circle. Outside the radar hardware limit, radar cannot be seen and the workstation graphics video is always displayed independent of mixed Modes 1, 2 or 3.

What is claimed:

1. A radar indicator, comprising:
    a source of radar image signals having a first $(r,\theta)$ format;
    a digital scan converter coupled to and responsive to said radar image signals for converting said radar image signals from said first format to digital radar image signals having a second (X-Y) format, said digital scan converter including an image memory for supplying said digital radar image signals having said second (X-Y) format;
    an source 16 of external video image signals having said second format, including video synchronization signals;
    a synchronization signal stripper and clock signal generator circuit 10 coupled to and responsive to said video synchronization signals of said external video image signals for generating a clock signal synchronized with the synchronization signals of said external video image signals;
    said clock signal being applied to the image memory of said digital scan converter for causing controlled read-out of said digital radar image signals in a manner synchronized with the image signals of said source of external video image signal;
    video processing circuitry coupled to and responsive to said synchronized digital radar image signals for developing a radar video signal from said synchronized radar image signals; and
    a video mixer circuit for mixing in a controlled manner said external video image signal with said synchronized radar video signals.

2. The radar indicator of claim 1, further including:

a display for displaying said mixed external video images with said radar video images.

3. The radar indicator of claim 1, wherein said clock signal has a frequency and phase which is synchronized with the synchronization signals of said external video image signals.

4. The radar indicator of claim 1, wherein said video mixer circuit includes switching circuitry responsive to both of said external and radar video image signals for controlling the supply of the mixed signals to said display on a pixel-by-pixel basis.

5. In a radar indicator system of the type having a digital scan converter, which converter includes an image memory and video processing circuit for developing a radar video image signal for display in a first display format, a means for mixing signals from a source of external video image signals having a second, different, display format with said radar video image signals having said first display format, comprising:

synchronization signal stripper means coupled to and responsive to said external video image signal for developing a clock signal synchronized to said external video image signal, said image memory and video signal generating circuit of said digital scan converter being responsive to said clock signal for generating a radar video image signal synchronized with said external video image signal; and controlled mixing means having inputs coupled to and responsive to said synchronized external and radar video image signals for developing at an output a single composite video image signal which is a combination of both said external and radar video signals.

6. The radar indicator of claim 5, further including:
a display responsive to said combined video signal for developing images thereon in response to said composite video signal.

7. The radar indicator of claim 5, wherein said clock signal has a frequency and phase which is synchronized with the synchronization signals of said external video image signals.

8. The radar indicator of claim 5, wherein said controlled mixing means includes switching circuitry responsive to both of said external and radar video image signals for controlling the supply of the composite video signal to said display on a pixel-by-pixel basis.

9. Apparatus for interfacing a source of radar signals having a first scan format with a source of external video image signals having a second, different, scan format, comprising:

a digital scan converter, which converter includes an image memory and video processing circuit for developing a radar video image signal, and a means for mixing signals from a source of external video image signals having a second, different, display format with said radar video image signals, said mixing means comprising, synchronization signal stripper means coupled to and responsive to said external video image signal for developing a clock signal synchronized to said external video image signal, said image memory and video processing circuit of said digital scan converter being responsive to said clock signal for generating a radar video image signal synchronized with said external video image signal; and controlled mixing means having inputs coupled to and responsive to said synchronized external and radar video image signals for developing at an output a single composite video image signal which is a combination of both said external and radar video signals.

10. Apparatus in accordance with claim 9, further including:
a workstation comprising a general purpose computer and a display, wherein the workstation includes a graphics controller for supplying said external video image signal to said controlled mixing means, and a display which is responsive to the composite video signal developed by the controlled mixing means for developing images thereon which are a combination of both said external and radar video signals.

11. The apparatus of claim 10, wherein said clock signal has a frequency and phase which is synchronized with the synchronization signals of said external video image signals.

12. The apparatus of claim 11, wherein said controlled mixing means includes switching circuitry responsive to both of said external and radar video image signals for controlling the supply of the composite video signal to said display on a pixel-by-pixel basis.

* * * * *